United States Patent

[11] 3,585,755

| [72] | Inventor | Robert Albert Thomas<br>Kortrijk, Belgium |
|---|---|---|
| [21] | Appl. No. | 776,888 |
| [22] | Filed | Nov. 19, 1968 |
| [45] | Patented | June 22, 1971 |
| [73] | Assignee | Trefileries Leon Bekaert, PVBA<br>Zwevegum, Belgium |
| [32] | Priority | Nov. 23, 1967 |
| [33] | | Belgium |
| [31] | | 706 940 |

[54] WIRE NETWORK FOR HOP-GROWING FIELDS
4 Claims, 12 Drawing Figs.

[52] U.S. Cl. .................................................. 47/45
[51] Int. Cl. ............................................... A01g 9/12
[50] Field of Search .......................................... 47/20—22,
26—31, 42—47

[56] References Cited
UNITED STATES PATENTS

| 499,520 | 6/1893 | Cook | 47/43 |
|---|---|---|---|
| 675,850 | 6/1901 | Brunneder | 47/45 |
| 811,276 | 1/1906 | Cooper | 47/45 |
| 1,080,758 | 12/1913 | Glascock | 47/43 |
| 2,906,062 | 9/1959 | Hohenfeldt | 47/47 |

FOREIGN PATENTS

| 612,042 | 10/1926 | France | 47/45 |
|---|---|---|---|
| 1,518,628 | 2/1968 | France | 47/45 |

Primary Examiner—Robert E. Bagwill
Attorney—Sparrow and Sparrow

ABSTRACT: A framework for hop-growing fields consisting of a steel cable network supported by hinged poles on the corners and at intermediate locations. The network supports the overhead wire lines from which the vertical climbing wires for the hop vines are suspended.

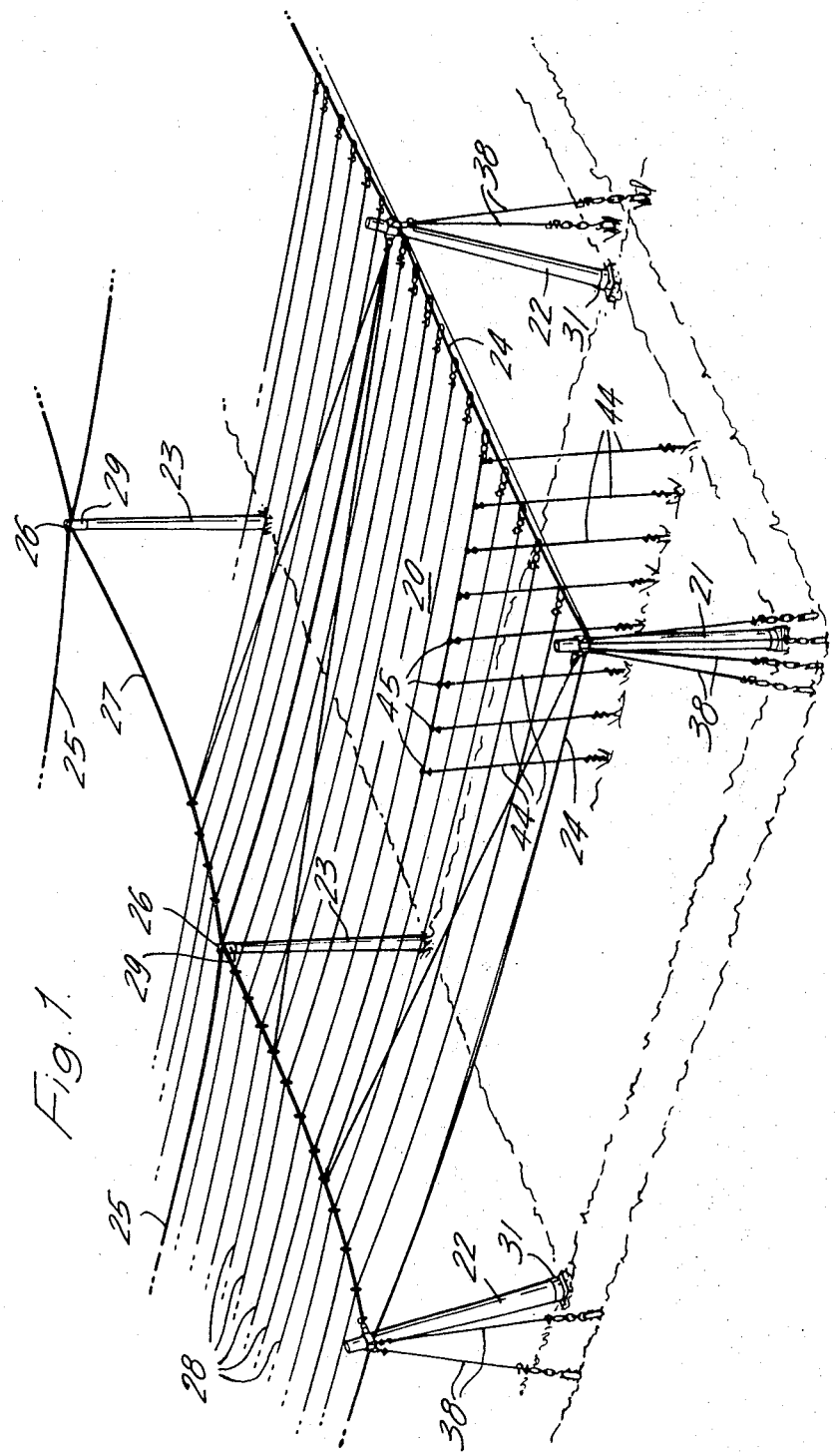

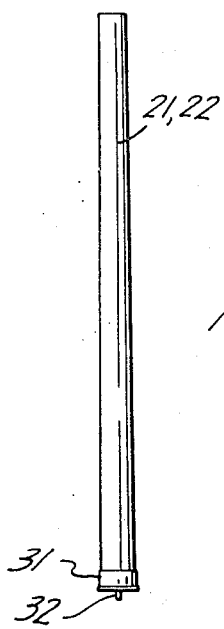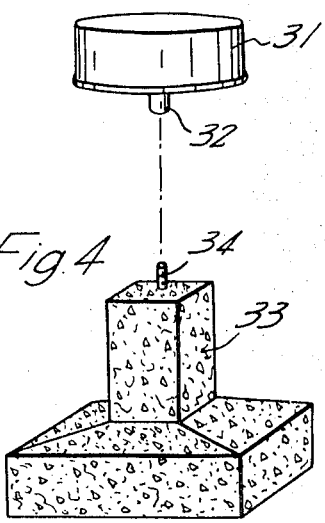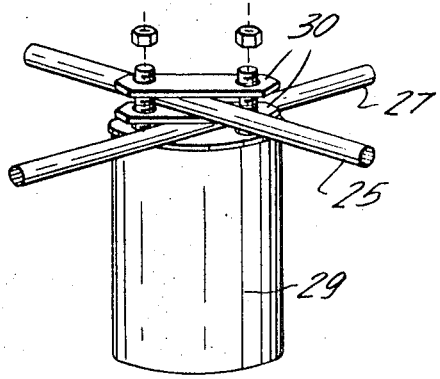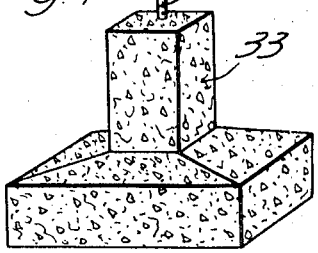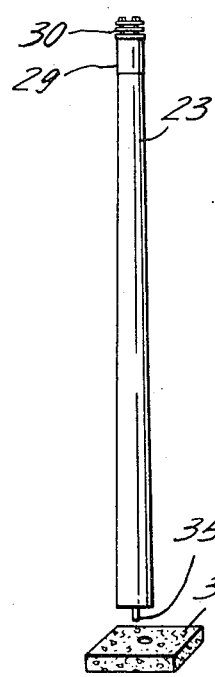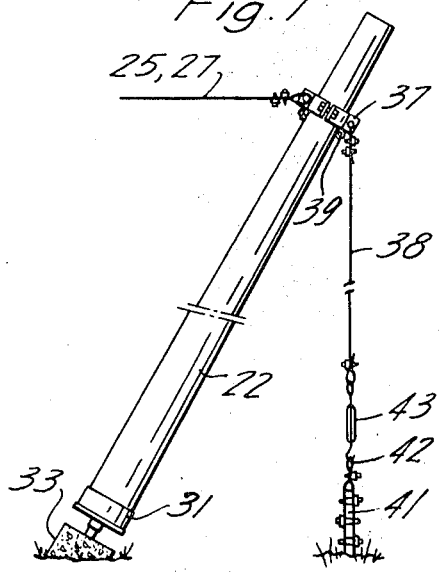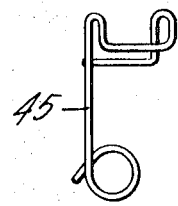

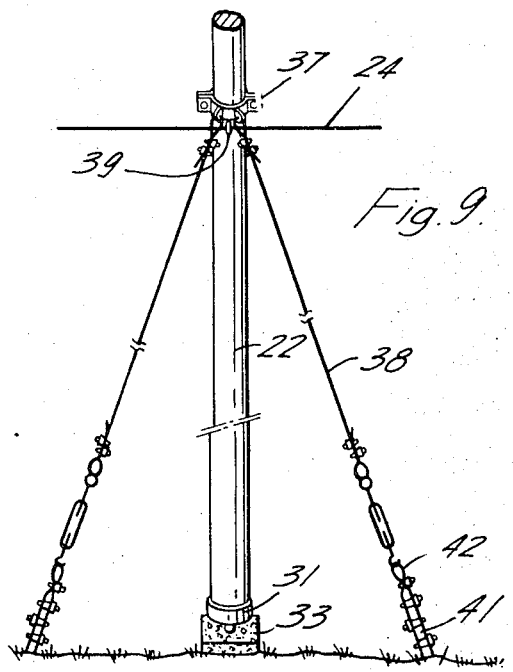
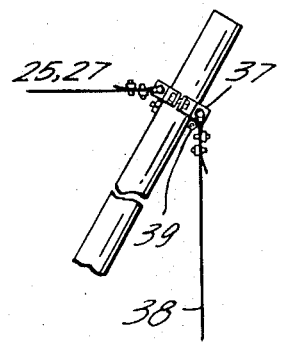
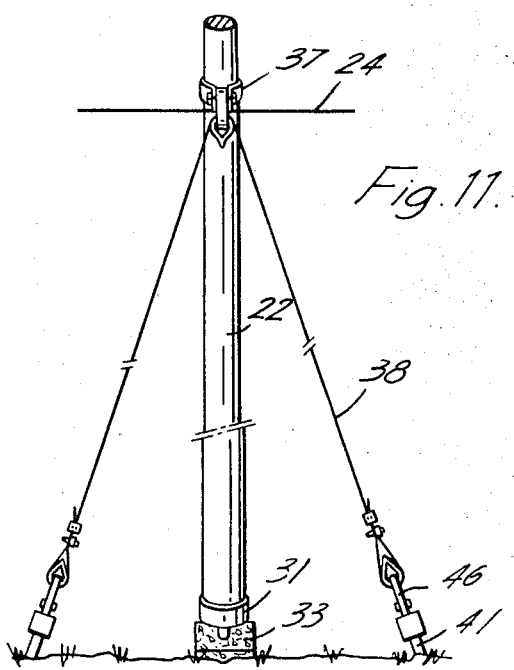
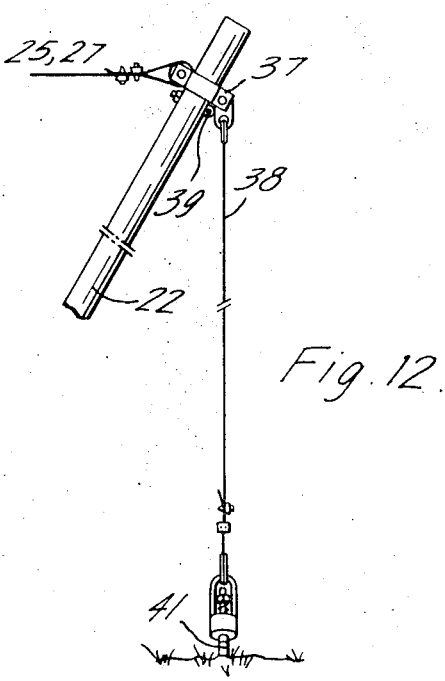

WIRE NETWORK FOR HOP-GROWING FIELDS

BACKGROUND OF THE INVENTION

The invention relates to steel cable network on upright poles, forming a framework over a hop-growing field for supporting the wires on which the vertical climbing wires are fastened.

The conventionally known frameworks for hop-growing fields consist of a number of poles which are driven into the ground over which horizontal wires are tightened on which, in turn, the vertical climbing for the hop vines are fastened. These poles comprise corner poles, intermediate side poles and intermediate inside poles. The corner poles and the intermediate side poles along the longitudinal side of the field are conventionally spaced apart at approximately 30 feet, whereas the intermediate side poles and the intermediate inside poles in the rows along the right-angle side of the field are spaced apart at about 8 to 10 feet distances. Steel wires are stretched over the top of the poles in the longitudinal direction and in the right-angle direction. The wires are fastened at the tops of the poles. A number of supporting wires are fastened on these steel wires, and the rows of vertical climbing wires for the hop vines are eventually fastened with twine on the supporting wires.

This known framework for hop-growing fields has some disadvantages. A considerable number of poles are needed for a hop field; for example, for a field of approximately 2 ½ acres approximately 84 corner poles and intermediate side poles and 300 inside poles are used. Obviously this amounts to a great deal of maintenance, to a relatively short life of the material and to considerable damage caused by storms and heavy winds. However the most important disadvantage is that a mechanization of hop growing and hop picking is considerably handicapped by the great number of poles. Furthermore, a crop rotation is rather impossible.

It is intended to solve these problems by the present invention.

SUMMARY OF THE INVENTION

The invention consists of such novel features, construction arrangements, combinations of parts and improvements as may be shown and described in connection with the structure herein disclosed by way of examples only and as illustrative of preferred embodiments. The basic concept of the invention is aimed at a simplification and improvement of the existing prior art.

The invention provides a new and improved framework for hop-growing fields, with a considerable reduction of the number of poles, for a better mechanization of the hop growing and of the hop picking so that a more intensified cultivation is possible and for obtaining eventually the facility of crop rotating on the same field without dismantling the framework.

Further objects and advantages of the invention will be set forth in part hereafter and in part will be obvious therefrom or may be learned by practicing the invention, the same being realized and attained by means of the instrumentalities and combinations pointed out in the appended claims.

It is an object of the invention to provide an improved network for hop-growing fields utilizing heavily galvanized, high-tensile steel wire cables, resulting in the provision of larger distances between the poles.

Another object of the invention is to provide supporting cables, which are stretched over the field for attaching the wires for the climbing hop vines, having a rust and corrosion preventing coating consisting substantially of thermoplastic material.

A further object of the invention is to provide cable framework supporting timber poles with steel sleeves at the lower end thereof, with short, protruding tubes for being placed over anchor pins, forming hinges on which the poles are movable.

Yet another object of the invention is to provide anchors made preferably of steel which are screwed into the ground for the steel cables holding the corner poles and the intermediate side poles.

Various further and more specific purposes, features and advantages will clearly appear from the detailed description given below taken in connection with the accompanying drawing which forms part of this specification and illustrates merely by way of example one embodiment of the structure of the system of the invention.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the several figures of the drawing, in which FIG. 1 is a perspective view of a self-supporting part of a hop field;

FIG. 2 is a side view of a corner and an intermediate side pole;

FIG. 3 is a side view of an intermediate inside pole;

FIG. 4 is a side view of the reinforced base for both the corner and the intermediate side poles;

FIG. 5 is a side view of the steel sleeve for the timber pole with the protruding steel tube;

FIG. 6 is a side view of the steel cap of the intermediate inside pole for fastening of the steel wire cables of the network;

FIG. 7 is a side view of a corner pole or an intermediate side pole with tightening wires and anchorage;

FIG. 8 is a view of a fastener for the climbing wires;

FIG. 9 is a view of an intermediate side pole with anchoring wires;

FIG. 10 is a detail view of the cable-fastening head of the pole shown in FIG. 9;

FIG. 11 is a modification of the pole shown in FIG. 9; and

FIG. 12 is a detail view of the cable-fastening head of the modification shown in FIG. 11 and the anchor fastening of the pole.

DESCRIPTION OF THE PREFERRED EMBODIMENTS

Referring now in more detail to the drawing illustrating preferred embodiments of a system of framework for hop growing by which the invention may be realized. It comprises a wire cable network and hinged angle and edge poles kept upright by tightening wires, the poles and tightening wires being used as support for the wire system on which the trailing wires, where the hop tendrils climb. Hop being a creeper, it grows on a framework. Except for the trailing or climbing wires, all the other wires are preferably heavy galvanized steel wire cables which may or may not be plastic coated.

There is disclosed in FIG. 1 a general perspective view of part of a hop field which is subdivided into self-supporting portions. The wire cable network, designated by the general numeral 20 is supported by corner poles 21, by the intermediate side poles 22 and by the intermediate inside poles 23. The self-supporting portions are connected with one another by outside wire cables 24 and by lengthwisely extending top wire cables 25 disposed over the tops 26 of inside poles 23, and by placing crosswisely or widthwisely extending top wire cables 27 across the field over the same tops 26 of inside poles 23. The supporting wires 28 extend longitudinally over the field and are fixedly attached to and supported by the wire cables 27 laid across the field. Each top 26 of inside poles 23 consists of a sleeve 29, preferably of steel, which carries the clamping plate 30. The lengthwisely extending wire cables 25 and the crosswisely or widthwisely extending wire cables 27, where they cross or intersect each other, are firmly clamped on top 26 by clamping plates 30. Corner poles 21 and intermediate side poles 22 are outwardly inclined at an angle of approximately 60°, as shown in FIGS. 1, 7, 10 and 12. A sleeve 31 (FIG. 5), preferably of steel, is placed over the foot end of each corner pole 21 and of each intermediate side pole 22 (FIGS. 7, 9, 11). A tube 32, preferably of steel, is welded onto the lower face of sleeve 31 (FIG. 5). Each one of the corner poles 21 and of intermediate side poles 22 is firmly supported by a base 33 consisting of preferably concrete which is set into the ground in such manner that the top of it protrudes slightly over the surrounding ground (FIGS. 7, 9, 11). A cylindrical pin 34 is preferably of steel is embedded in the center of base 33. Tube 32 fits freely over pin 34 so that a kind of hinge is formed providing some mobility for poles 21 and 22. A pin 35 preferably of steel is placed into the foot end into each intermediate inside pole 23 for anchoring pole 23 in the center hold of a preferably concrete baseplate 36 which is placed approximately 2½feet deep into the ground. Intermediate inside poles 23 rest solidly on baseplates 36; their mobility not being as important as the relative freedom of movement of corner poles 21 and intermediate side poles 22. A collar 37 is fastened at the top end of each corner pole 21 and each intermediate side pole 22. Anchor stays 38 are fastened on collars 37, and also top wires 25 and 28 are attached to collars 37. Hooks 39, each of which has a head, are secured to intermediate side poles 22 below collars 37. Outside wires 24 are tightened between the heads of hooks 39 and pole 22 (FIGS. 9, 11).

Helicoidally twisted anchor plates 41, preferably heavily galvanized, having a square head portion (not visible in the drawing) are fixed into the ground for fastening anchor stays 38 thereto. Each anchor plate 41 has an eyelet 42 at the upper end of plate 41 and a screw-type takeup device 43 is hooked between stay 38 and eyelet 42 for tightening stays 38 from time to time as it may become necessary. A hinged eyelet 46 (FIG. 11) in which anchor stay 38 may move freely, may be used instead of fixed eyelet 42. Climbing wires 44 are attached to supporting wires 28, where the hop plants grow, by means of the fasteners 45. Supporting wires 28, climbing wires 44 and fasteners 45 are advantageously protected against rusting and corrosion caused by the insecticide and fungicide means which are used for spraying and growing plants, by coating wires and fasteners with thermoplastics such as polyvinylchlorides or the like plastics.

While the invention has been described and illustrated with respect to certain preferred examples which give satisfactory results, it will be understood by those skilled in the art after understanding the principle of the invention that various changes and modifications may be made without departing from the spirit and scope of the invention and it is intended therefor in the appended claims to cover such changes and modifications.

What I claim is:

1. In a subdivided support system for hop vines including vertically extending support poles and a substantially horizontally disposed wire framework divided into subdivisions supported thereby the combination comprising, a corner pole disposed at each of the four corners of each subdivision of the framework, each such corner pole including a shank portion, a bottom cap mounted thereon including mounting means, at least one intermediate outside pole of similar construction as said corner pole disposed between each of said corner poles along a side of said framework, at least one intermediate inside pole disposed between each intermediate outside pole, said intermediate inside poles each including a shank portion, a top cap mounted thereon, said top cap including clamping means to supportingly receive the clamp selected portions of said framework, base members embedded in the ground, said corner and said intermediate outside poles being mounted on said base members and extending upwardly and outwardly, said corner poles and said intermediate outside poles being mounted on said base members and extending upwardly and outwardly with respect to the interior of said framework, said intermediate inside poles mounted substantially perpendicularly to the ground and including mounting means on the bottom ends thereof, said mounting means including a base member imbedded in the ground, guy wire means interconnecting each corner and each outside intermediate pole with the ground to maintain said angular disposition of said poles, an outside wire cable connected to each corner pole in each subdivision and in contact with each intermediate outside pole, a plurality of parallel top wires each connected to and extending between said intermediate outside poles and clamped to selected intermediate inside poles, a plurality of parallel supporting wires connected to said outside cables and extending across selected top wire cables and in parallel relation with selected other top wire cables, and a plurality of vine cables connected at spaced intervals to said supporting cables and extending to the ground in close proximity to said hop vines.

2. The invention defined in claim 1 wherein mounting means for said intermediate outside poles include hinging means attached to the bottom thereof comprising a sleeve encircling said pole and a tube protruding therefrom.

3. The invention defined by claim 1 wherein each of said corner poles and said intermediate outside poles include collar means attached thereto said collar means including cable receiving and supporting means, said cables connected thereto.

4. The invention defined by claim 3 wherein said cable receiving and supporting means include hooks for fastening said outside wire cable on said poles.